(12) United States Patent
Siddiqui et al.

(10) Patent No.: US 10,445,861 B2
(45) Date of Patent: Oct. 15, 2019

(54) REFINEMENT OF STRUCTURED LIGHT DEPTH MAPS USING RGB COLOR DATA

(71) Applicant: QUALCOMM Incorporated, San Diego, CA (US)

(72) Inventors: Hasib Siddiqui, San Diego, CA (US); Kalin Atanassov, San Diego, CA (US); James Nash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 205 days.

(21) Appl. No.: 15/432,783

(22) Filed: Feb. 14, 2017

(65) Prior Publication Data

US 2018/0232859 A1  Aug. 16, 2018

(51) Int. Cl.
| | | |
|---|---|---|
| G06K 9/00 | (2006.01) | |
| G06T 5/00 | (2006.01) | |
| G06T 7/50 | (2017.01) | |
| G06T 7/90 | (2017.01) | |
| G06T 5/50 | (2006.01) | |

(52) U.S. Cl.
CPC .............. *G06T 5/002* (2013.01); *G06T 5/005* (2013.01); *G06T 5/50* (2013.01); *G06T 7/50* (2017.01); *G06T 7/90* (2017.01); *G06T 2207/10024* (2013.01); *G06T 2207/10028* (2013.01)

(58) Field of Classification Search
None
See application file for complete search history.

(56) References Cited

U.S. PATENT DOCUMENTS

| | | | | |
|---|---|---|---|---|
| 8,532,425 B2* | 9/2013 | Ali | ........................ | G06T 3/4007 |
| | | | | 382/260 |
| 8,854,425 B2* | 10/2014 | Varekamp | ............... | G06T 5/005 |
| | | | | 348/42 |
| 8,885,890 B2* | 11/2014 | Tardif | .................... | G06T 5/002 |
| | | | | 382/106 |
| 9,202,287 B2* | 12/2015 | Jung | ....................... | G06T 7/174 |
| 9,210,404 B2* | 12/2015 | Hall | ........................ | G06F 3/017 |
| 9,294,662 B2* | 3/2016 | Vondran, Jr. | ......... | H04N 13/133 |

(Continued)

FOREIGN PATENT DOCUMENTS

| | | |
|---|---|---|
| KR | 101618776 B1 | 5/2016 |
| WO | WO-2013173749 A1 | 11/2013 |
| WO | WO-2016202837 A1 * | 12/2016 ............. G06T 5/002 |

OTHER PUBLICATIONS

Iterative transductive learning—RGB-D data, Bei He et al., Elsevier, 1047-3203, 2014, pp. 1031-1043 (Year: 2014).*

(Continued)

*Primary Examiner* — Jayesh A Patel
(74) *Attorney, Agent, or Firm* — QUALCOMM Incorporated (57) ABSTRACT

Systems and method for refining a depth map of a scene based upon a captured image of the scene. A captured depth map of the scene may contain outage areas or other areas of low confidence. The depth map may be aligned with a color image of the scene, and the depth values of the depth map may be adjusted based upon corresponding color values of the color image. An amount of refinement for each depth value of the aligned depth map is based upon the confidence value of the depth value and a smoothing function based upon a corresponding location of the depth value on the color image.

31 Claims, 8 Drawing Sheets

(56) References Cited

U.S. PATENT DOCUMENTS

| | | | |
|---|---|---|---|
| 9,305,360 B2* | 4/2016 | Parfenov | G06T 5/003 |
| 9,313,473 B2* | 4/2016 | Yang | G06T 5/002 |
| 9,361,680 B2* | 6/2016 | Takahashi | G06T 5/003 |
| 9,460,339 B2* | 10/2016 | Litvak | G06K 9/00375 |
| 9,697,647 B2* | 7/2017 | Kamat | G06T 19/006 |
| 9,710,955 B2* | 7/2017 | Kobayashi | G06T 19/20 |
| 10,003,787 B1* | 6/2018 | Wan | G06T 7/12 |
| 2005/0104879 A1* | 5/2005 | Kaye | G06T 3/00 345/419 |
| 2007/0024614 A1* | 2/2007 | Tam | H04N 13/261 345/419 |
| 2009/0196492 A1* | 8/2009 | Jung | G06K 9/20 382/154 |
| 2009/0324059 A1* | 12/2009 | Boughorbel | G06T 7/55 382/154 |
| 2010/0080448 A1* | 4/2010 | Tam | H04N 13/261 382/154 |
| 2010/0110070 A1* | 5/2010 | Kim | H04N 13/128 345/419 |
| 2010/0182410 A1* | 7/2010 | Verburgh | G06T 7/579 348/51 |
| 2010/0239187 A1* | 9/2010 | Yea | G06T 3/40 382/298 |
| 2010/0316284 A1* | 12/2010 | Jeong | G06T 5/002 382/162 |
| 2011/0032341 A1* | 2/2011 | Ignatov | H04N 13/144 348/51 |
| 2011/0268177 A1* | 11/2011 | Tian | G06T 5/50 375/240.01 |
| 2011/0285910 A1* | 11/2011 | Bamji | G01S 17/89 348/631 |
| 2012/0087573 A1* | 4/2012 | Sharma | G06K 9/00771 382/154 |
| 2012/0280996 A1* | 11/2012 | Kannan | G06T 15/20 345/426 |
| 2012/0287233 A1* | 11/2012 | Wang | H04N 13/128 348/42 |
| 2013/0107010 A1* | 5/2013 | Hoiem | G06K 9/46 348/47 |
| 2013/0170736 A1* | 7/2013 | Guo | G06T 5/002 382/154 |
| 2014/0002595 A1* | 1/2014 | Po | H04N 13/111 348/43 |
| 2014/0079336 A1* | 3/2014 | Venkataraman | G06T 5/005 382/275 |
| 2014/0132722 A1* | 5/2014 | Martinez Bauza | G01B 11/25 348/46 |
| 2014/0285623 A1* | 9/2014 | Bruls | G06T 5/002 348/43 |
| 2014/0294288 A1* | 10/2014 | Nguyen | G06K 9/38 382/154 |
| 2015/0036926 A1* | 2/2015 | Choi | G06T 5/003 382/167 |
| 2015/0043783 A1* | 2/2015 | Ishihara | G06T 7/571 382/106 |
| 2015/0071526 A1* | 3/2015 | Nguyen | G06T 5/10 382/154 |
| 2015/0172623 A1* | 6/2015 | Wu | H04N 13/139 348/43 |
| 2015/0195443 A1* | 7/2015 | Dal Mutto | H04N 5/2628 348/211.11 |
| 2015/0206312 A1* | 7/2015 | Luo | G06T 7/194 382/173 |
| 2015/0254868 A1* | 9/2015 | Srikanth | H04N 5/23216 348/47 |
| 2015/0381965 A1* | 12/2015 | Atanassov | H04N 5/23245 348/47 |
| 2016/0063715 A1* | 3/2016 | Wan | G06T 3/40 382/195 |
| 2016/0239980 A1* | 8/2016 | Tian | G06T 7/11 |
| 2016/0247284 A1* | 8/2016 | Zaytsev | G06K 9/00973 |
| 2016/0321827 A1* | 11/2016 | Xiao | G06K 9/00 |
| 2016/0379405 A1* | 12/2016 | Baca | G06F 16/29 463/32 |
| 2017/0011524 A1* | 1/2017 | Shpunt | G01B 11/22 |
| 2017/0032192 A1* | 2/2017 | Teichman | G06K 9/00771 |
| 2017/0124717 A1* | 5/2017 | Baruch | G06T 7/187 |
| 2017/0178332 A1* | 6/2017 | Lindner | G06T 5/002 |
| 2017/0302910 A1* | 10/2017 | Richards | G06T 7/593 |
| 2017/0372479 A1* | 12/2017 | Somanath | G06T 7/136 |
| 2017/0374341 A1* | 12/2017 | Michail | G06T 3/60 |
| 2018/0232859 A1* | 8/2018 | Siddiqui | G06T 5/002 |

OTHER PUBLICATIONS

International Search Report and Written Opinion—PCT/US2018/014022—ISA/EPO—dated Apr. 26, 2018.

Or-El R.et al., "RGBD-Fusion: Real-Time High Precision Depth Recovery", IEEE Conference on Computer Vision and Pattern Recognition (CVPR), 2015, pp. 5407-5416.

* cited by examiner

REFINEMENT OF STRUCTURED LIGHT DEPTH MAPS USING RGB COLOR DATA

FIELD

This disclosure generally relates to systems and methods for light field projection, and more particularly to depth map generation.

BACKGROUND

Structured light systems may transmit and receive light patterns, or spatial codes, to generate a depth map. The farther away an object is from the transmitter and receiver, the smaller the disparity between the light pattern reflected by object and its original location will be, as the outgoing projection and incoming projection are more parallel. Conversely, the closer an object is to the transmitter and receiver, the bigger the disparity between received light pattern and its original position will be. Thus, the difference between received and transmitted light pattern (codeword) position gives the depth of the scene or object. Structured light systems use these relative depths to generate a depth map or a three dimensional representation of a scene. Depth map extraction is critical to many applications ranging from camera quality enhancement to computer vision.

SUMMARY

The systems, methods and devices of this disclosure each have several innovative aspects, no single one of which is solely responsible for the desirable attributes disclosed herein.

In some embodiments, a computer-implemented method for refining a depth map is provided. The method comprises receiving a depth map of a scene, the depth map comprising depth values corresponding to different locations of the scene, each depth value associated with a confidence value. The method further comprises receiving a color image of the scene captured by a camera. The method further comprises aligning the depth map with the color image, such that each location on the aligned depth map corresponds to a corresponding location on the color image. The method further comprises refining the depth values of the aligned depth map, wherein an amount of refinement for each depth value of the aligned depth map is based upon the confidence value of the depth value and a smoothing function based upon a corresponding location of the depth value on the color image.

In some embodiments, an apparatus for refining a depth map is provided. The apparatus comprises a depth map generation system configured to generate a depth map of a scene, the depth map comprising depth values corresponding to different locations of the scene, each depth value associated with a confidence value. The apparatus further comprises a camera configured to capture a color image of the scene. The apparatus further comprises at least one processor configured to receive the depth map of the scene from the depth map generation system. The at least one processor is further configured to receive the color image of the scene captured by the camera. The at least one processor is further configured to align the depth map with the color image, such that each location on the aligned depth map corresponds to a corresponding location on the color image. The at least one processor is further configured to refine the depth values of the aligned depth map, wherein an amount of refinement for each depth value of the aligned depth map is based upon the confidence value of the depth value and a smoothing function based upon a corresponding location of the depth value on the color image.

BRIEF DESCRIPTION OF THE DRAWINGS

Various features, nature and advantages may become apparent from the detailed description set forth below when taken in conjunction with the drawings in which like reference characters identify correspondingly throughout.

DETAILED DESCRIPTION

The following detailed description is directed to certain specific embodiments of the invention. However, the invention can be embodied in a multitude of different ways. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

In general, the present disclosure relates to techniques for light field projection and analysis. More specifically, this disclosure relates to systems and methods for constructing and refining depth maps based upon a projected light field.

In accordance with one or more aspects of the present disclosure, a generated depth map may be refined using a color image. For example, an amount of refinement for each depth value of the depth map may be based upon the confidence value of the depth value and a smoothing function based upon a corresponding location of the depth value on the color image.

Figure 1:
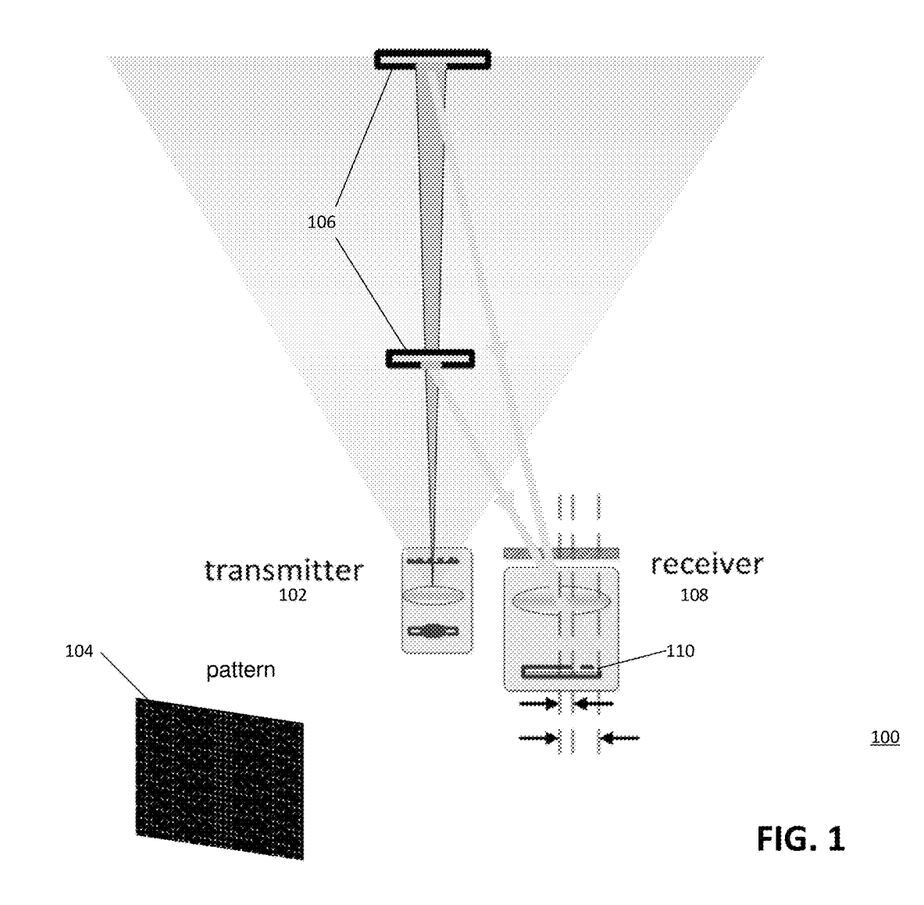
FIG. 1 illustrates an example of an active sensing system that may be used to obtain depth information of a scene, in accordance with some embodiments.

FIG. 1 illustrates an example of an active sensing system 100 where a known pattern is used to illuminate a scene and obtain depth information with which to generate 3-dimensional ("3D") information from 2-dimensional (2D") images and/or information. One or more aspects and/or features described herein may be implemented within such exemplary active sensing system 100. The system illustrated in FIG. 1 includes a transmitter 102 and a receiver 108. The transmitter 102 projects a light field through a code mask to project an image 104 of codewords on an object or scene 106. Herein, for clarity of description, "scene" may be used to refer to either or both a scene and an object depending on the context used. For example, a scene may include a single object of interest, or a plurality of objects of interest. A receiver 108 captures the reflected image 110 and codewords therein, and may use the codewords on the reflected image 110 to determine depth information for the scene. For example, a section of the code mask containing particular codewords may be projected onto the surface of an object in the scene 106. The projected section may then be captured by the receiver 108 and used to uniquely identify the codewords that make up the section. Thus, by covering the scene 106 with unique codewords in this manner, sections/portions of the scene 106 may be identified by reflected codewords and this information may be used for sensing the distance (depth) from the sensing device to objects in the scene.

From the image captured by the receiver 108, multiple codewords may be identified that were projected over the scene 106. Each captured codeword may be uniquely identifiable at the receiver 108 and its location relative to other codewords ascertained from the known pattern of the projected image 104.

In some embodiments, as the distance between the transmitter 102/receiver 108 and the object in scene 106 increases transmitted rays of projected codewords from the transmitter 102 to the object in scene 106 are more parallel to received (incoming) codewords reflected off of the surface of the object illuminated by the transmitted rays. Accordingly, codewords reflected from the object in scene 106 and received by a receiver 108 are closer to their original position (in the projected code image) when the object is farther away. Conversely, the closer the object in scene 106 is to the transmitter 102 and receiver 108, the farther the received codewords are from the original position of the codewords (in the projected code image) when they were transmitted. The difference between received and transmitted codeword positions can be used to determine one or more depths of a scene or an object. Structured light active sensing systems may use such depth information to generate a depth map or a three dimensional representation of a scene.

The concepts of this disclosure may be integrated in or be a part of a system (e.g., system 100 as illustrated in FIG. 1) that includes several elements and/or modes aimed at projecting light fields, receiving projected light fields, identifying projected codewords from the received light field, and generating a depth map based upon the locations of the projected codewords. The system 100 may include a memory configured to store image/video information relating to the image. The system 100 may include at least one processor (e.g., part of an integrated circuit (IC) and/or graphics processing unit (GPU)) coupled to the memory and configured to: receive a projected image, detect codeword boundaries within the received image, identify codewords based upon the detected codeword boundaries, generate a disparity map based upon the identified codewords, and generate a depth map based upon the disparity map.

Figure 2:
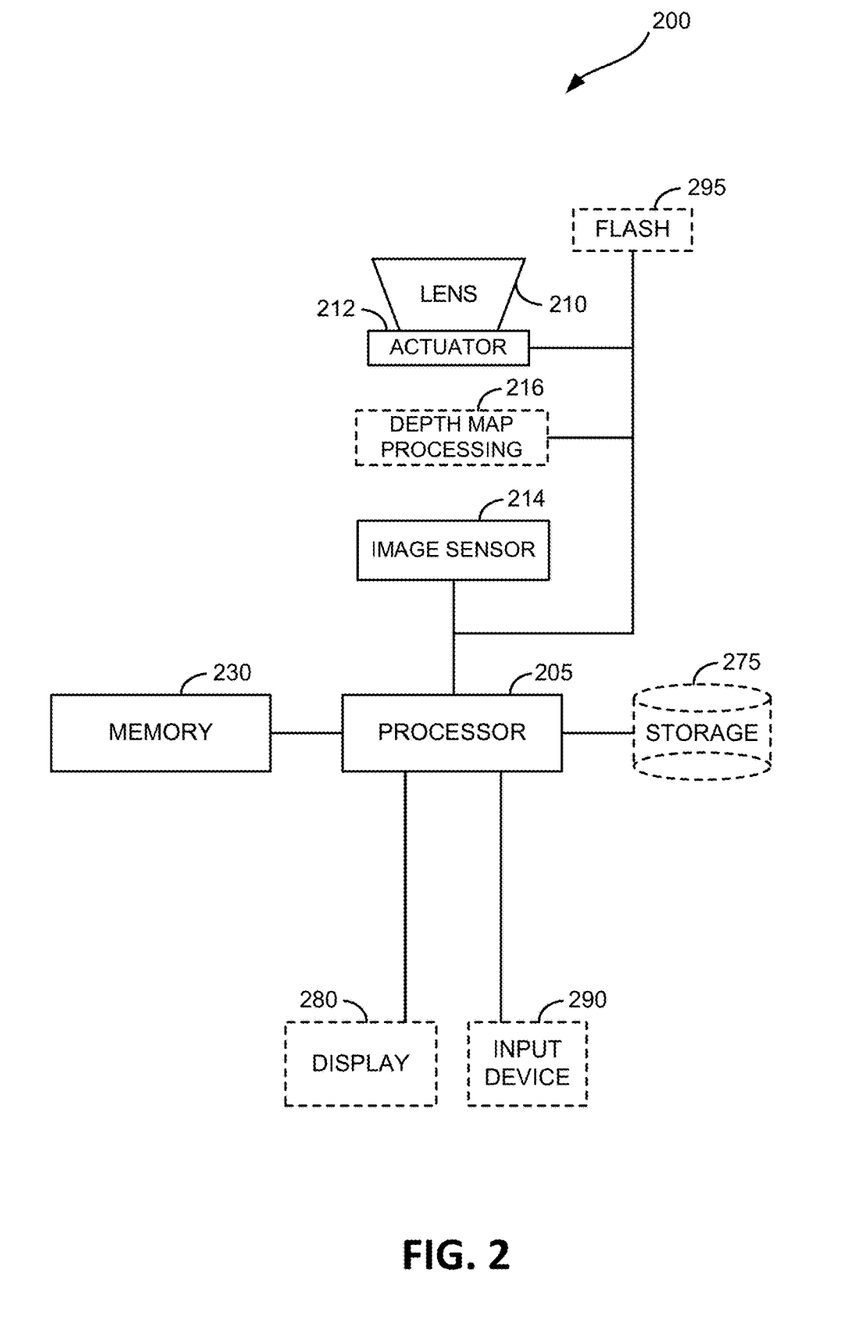
FIG. 2 depicts a block diagram illustrating an example of an imaging device in accordance with aspects of this disclosure.

FIG. 2 depicts a block diagram illustrating an example of an imaging device in accordance with aspects of this disclosure. The imaging device 200, also referred herein to interchangeably as a camera or an image receiver (e.g., receiver 108), may include a processor 205 operatively connected to an image sensor 214, a depth map processing integrated circuit (IC) 216, a lens 210, an actuator 212, a memory 230, an optional storage 275, an optional display 280, an optional input device 290, and an optional flash 295. In this example, the illustrated memory 230 may store instructions to configure processor 205 to perform functions relating to the imaging device 200, such as performing composite image processing.

In an illustrative embodiment, light enters the lens 210 and is focused on the image sensor 214. In some embodiments, the lens 210 is part of a system which can include multiple lenses and adjustable optical elements and may be controllable by the processor 205. In one aspect, the image sensor 214 utilizes a charge coupled device (CCD). In another aspect, the image sensor 214 utilizes either a complementary metal-oxide semiconductor (CMOS) or CCD sensor. The lens 210 is coupled to the actuator 212 and may be moved by the actuator 212 relative to the image sensor 214. The movement of the lens 210 with respect to the image sensor 214 may be used to focus captured image. For example, the actuator 212 may be configured to move the lens 210 in a series of one or more lens movements to adjust the lens position to change the focus of an image. In some embodiments, the processor 205 may comprise an image signal processor (ISP) able to perform one or more image processing functions, such as denoising, on captured image data.

The display 280 may be configured to display images captured via the lens 210 and the image sensor 214 and may also be utilized to implement configuration functions of the imaging device 200. In one implementation, the display 280 may be configured to display one or more regions of a captured image selected by a user, via an input device 290, of the imaging device 200. In some embodiments, the imaging device 200 may not include the display 280.

The input device 290 may take on many forms depending on the implementation. In some implementations, the input device 290 may be integrated with the display 280 so as to form a touch screen display. In other implementations, the input device 290 may include separate keys or buttons on the imaging device 200. These keys or buttons may provide input for navigation of a menu that is displayed on the display 280. In other implementations, the input device 290 may be an input port. For example, the input device 290 may provide for operative coupling of another device to the imaging device 200. The imaging device 200 may then receive input from an attached keyboard or mouse via the input device 290. In still other embodiments, the input device 290 may be remote from and communicate with the imaging device 200 over a communication network, e.g., a wireless network.

In some embodiments, the depth map processing IC 216 may be used to generate and/or refine depth maps on one or more captured images (e.g., captured by image sensor 214). For example, the depth map processing IC 216 may identify projected codewords from a received image of a scene in order to generate a depth map of the scene. In some embodiments the depth map processing IC 216 may receive color image data that may be used to refine a depth map (e.g., by calculating depth values for outage areas and/or refining depth values for low confidence areas of a depth map). The structure and operation of depth map processing IC 216 will be described in greater detail below in association with FIGS. 3-8. In some embodiments, one or more depth map processing functions may be performed by processor 205 (e.g., by an ISP) instead of by depth map processing IC 216, or by a combination of depth map processing IC 216 and processor 205. For example, the processor 205 may comprise an ISP capable of performing certain function used in depth map refinement, such as denoising functions.

The memory 230 may be utilized by the processor 205 to store data dynamically created during operation of the imaging device 200. In some instances, the memory 230 may include a separate working memory in which to store the dynamically created data. For example, instructions stored in the memory 230 may be stored in the working memory when executed by the processor 205. The working memory may also store dynamic run time data, such as stack or heap data utilized by programs executing on processor 205. The storage 275 may be utilized to store data created by the imaging device 200. For example, images captured via image sensor 214 may be stored on storage 275. Like the input device 290, the storage 275 may also be located remotely, i.e., not integral with the imaging device 200, and may receive captured images via the communication network.

The memory 230 may be considered a computer readable medium and stores instructions for instructing the processor 205 and/or depth map processing IC 216 to perform various functions in accordance with this disclosure. For example, in some aspects, memory 230 may be configured to store instructions that cause the processor 205 and/or depth map processing IC 216 to perform various methods, such as those as described below and as illustrated in FIGS. 3-8.

Depth Map Outages

In many applications, generated depth maps may contain outages (also referred to as holes) corresponding to regions of the depth map where no depth information was obtained. In some embodiments, outages may also refer to regions of the depth map where depth information of low confidence is obtained. Depth map outages may be caused by conditions within the scene that make it difficult to accurately identify projected codewords and patterns, thus preventing the acquisition of accurate depth information for the affected portions of the scene. These conditions may include tilted surfaces, textured surfaces (e.g., hair), shadowed areas, thin objects, and/or the like. In some embodiments, depth contours for objects within the scene (particular for small or thin objects) may deviate from the true contours of the object.

Figure 3:
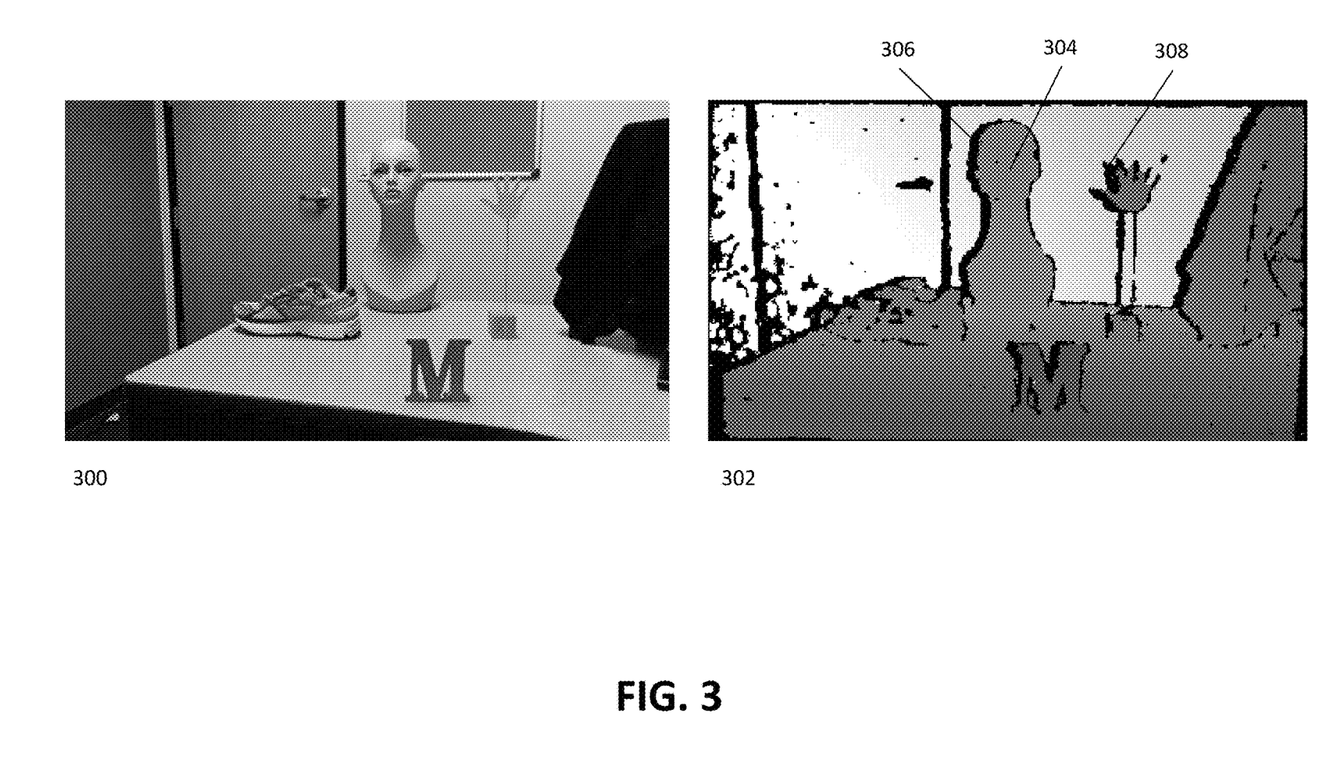
FIG. 3 illustrates a scene and a depth map that may be generated of the scene using structured light, in accordance with some embodiments.

FIG. 3 illustrates a scene and a depth map that may be generated of the scene using structured light, in accordance with some embodiments. As illustrated in FIG. 3, the scene 300 may contain a plurality of different objects having different shapes and positioned at different depths. Depth map 302 corresponds to a depth map that may be generated based upon scene 300 using structured light techniques. The depth map 302 may contain areas 304 having accurate depth information, as well as areas 306, 308 corresponding to outages in the depth map. For example, area 308 may be missing depth information due to shadows in the scene. In addition, the contours of the fingers at area 308 may not be well defined due to the size and width of the fingers.

Improving Depth Map Quality with Color Data

Figure 4:
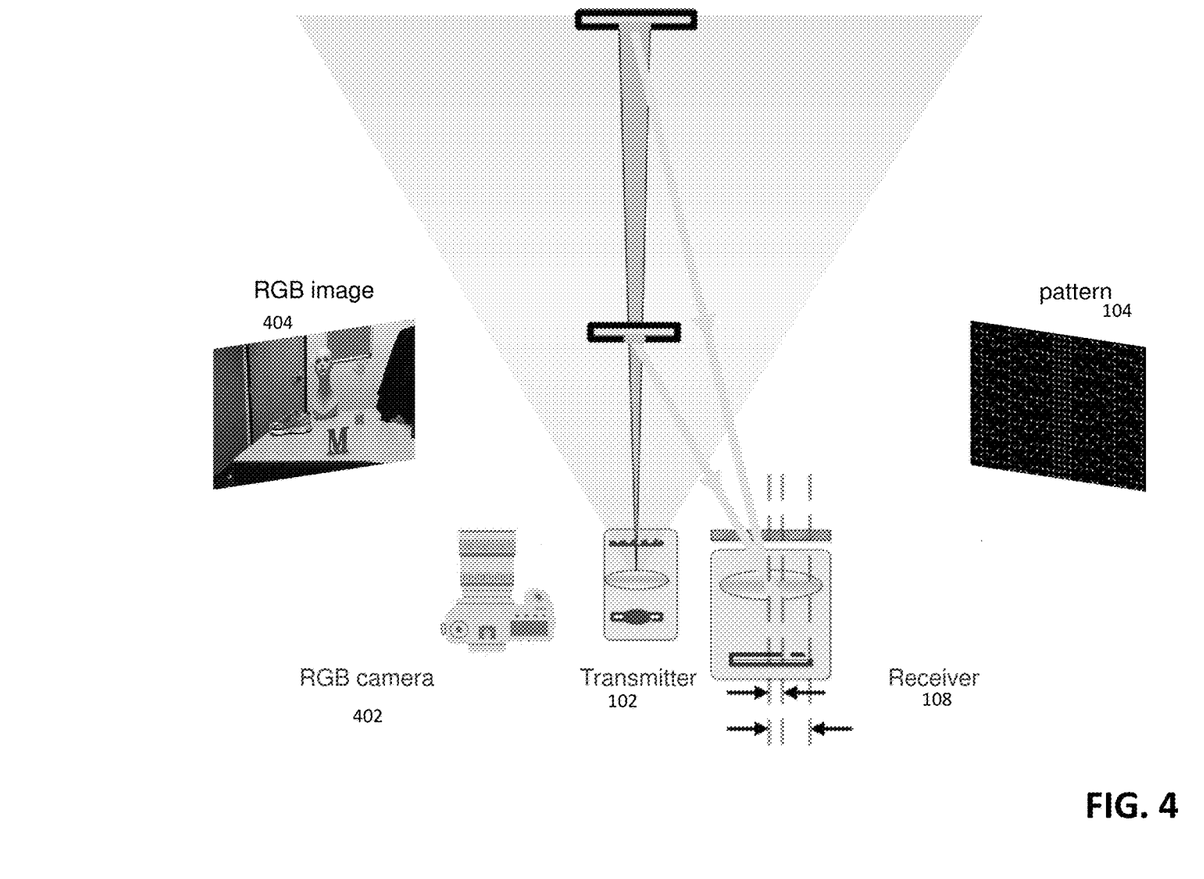
FIG. 4 illustrates an example system that may be used for depth map refinement, in accordance with some embodiments.

In some embodiments, data from captured images of the scene (e.g., an RGB color image) may be used to improve the quality of a generated depth map (e.g., by filling in outage areas of the depth map, correcting contours of the objects in the depth map, and/or the like). FIG. 4 illustrates an example system that may be used for depth map refinement, in accordance with some embodiments. The system 400 is similar to system 100 as illustrated in FIG. 1, but includes a camera 402 (e.g., an RGB camera) for capturing an image of the scene.

In some embodiments, the camera 402 may be placed next to the transmitter 102 or receiver 108. For example, the camera 402, transmitter 102, and receiver 108 may be placed in a line. In other embodiments, the camera 402, transmitter 102, and receiver 108 may be placed in other arrangements.

The camera 402 may be used to capture a color image 404 of the scene. For example, the image 404 may be an RGB image, although it is understood that in other embodiments, other types of images may be captured. The colors of various objects (e.g., background and foreground objects) in the captured image may be used to guide the refinement of the depth map. For example, the color values of the captured image 404 may be used to identify edges of objects in the scene, allowing for outages in the depth map to be filled in. In some embodiments, an amount of depth correction performed at a location on the depth map may be inversely related to a confidence associated with the location on the depth map. For example, areas of the depth map having high confidence may remain substantially the same following depth map refinement. On the other hand, areas of the depth map with low confidence, such as outage areas, may be adjusted a large amount during the course of depth map refinement.

Figure 5:
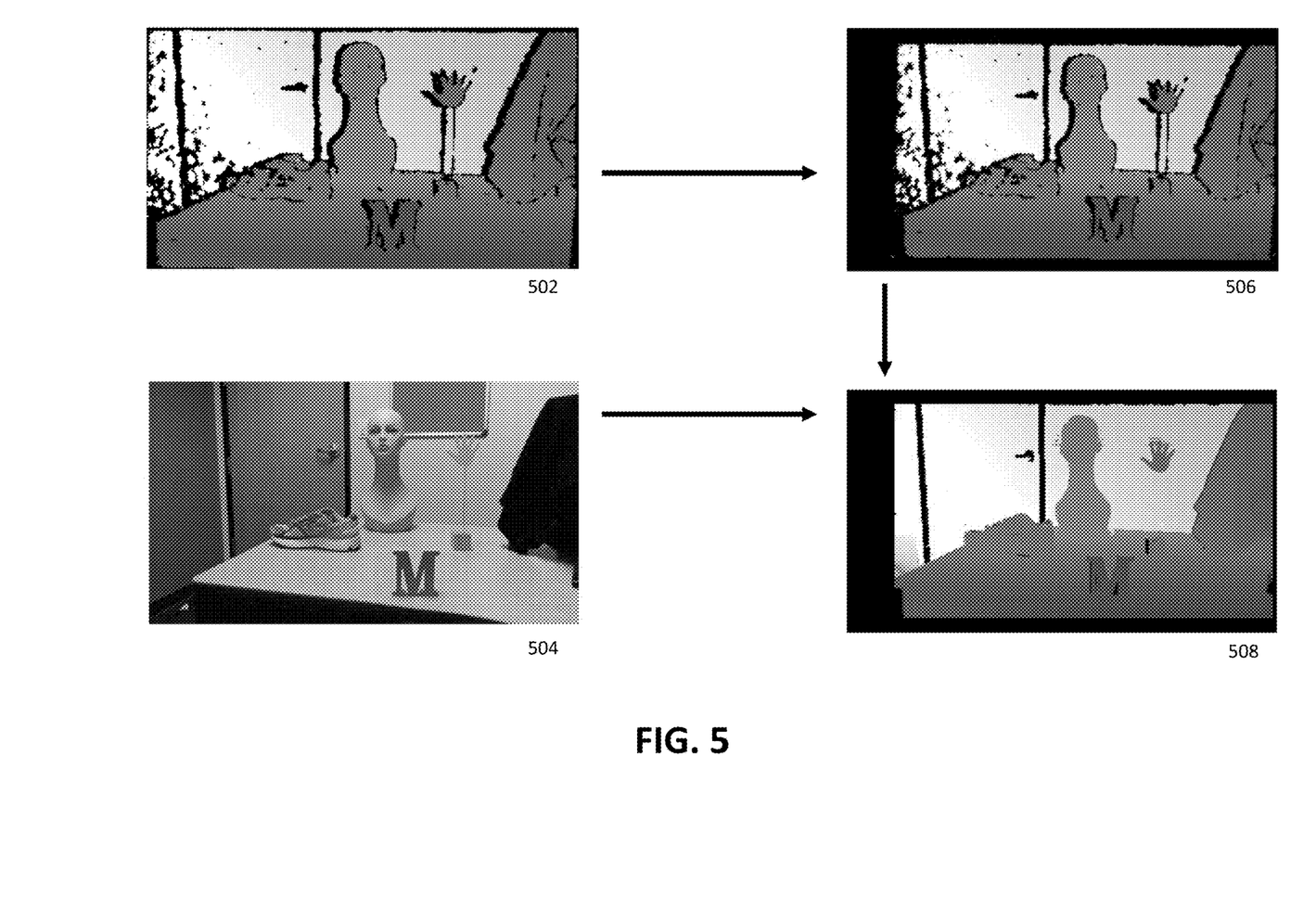
FIG. 5 illustrates a diagram of a process that may be used to perform depth map refinement, in accordance with some embodiments.

FIG. 5 illustrates a diagram of a process that may be used to perform depth map refinement, in accordance with some embodiments. As illustrated in FIG. 5, a depth map 502 may be generated using a structured light system comprising a transmitter and receiver. In addition, a color image 504 may be captured by a camera. The camera may be placed at a known position relative to the transmitter and receiver. Because the camera may be at a different position as the transmitter and receiver, the depth map 502 and color image 504 may not be aligned.

In some embodiments, one or more camera calibration parameters may be used to align the depth map 502 with the color image 504. For example, because the position of the camera relative to the transmitter and receiver is known, the depth map 502 may be warped based upon the one or more camera calibration parameters to generate an aligned depth map 506 that is aligned with the color image 504 such that the aligned depth map 506 may be overlaid on the color image 504. In other embodiments, the color image 504 may be warped to be aligned with the depth map 502.

The color image 504 may then be used to refine the aligned depth map 506 to produce a refined depth map 508. For example, the RGB color values of the color image 504 may be used to fill in missing values (e.g., outage areas) of the aligned depth map 506 to produce the refined depth map 508.

Figure 6:
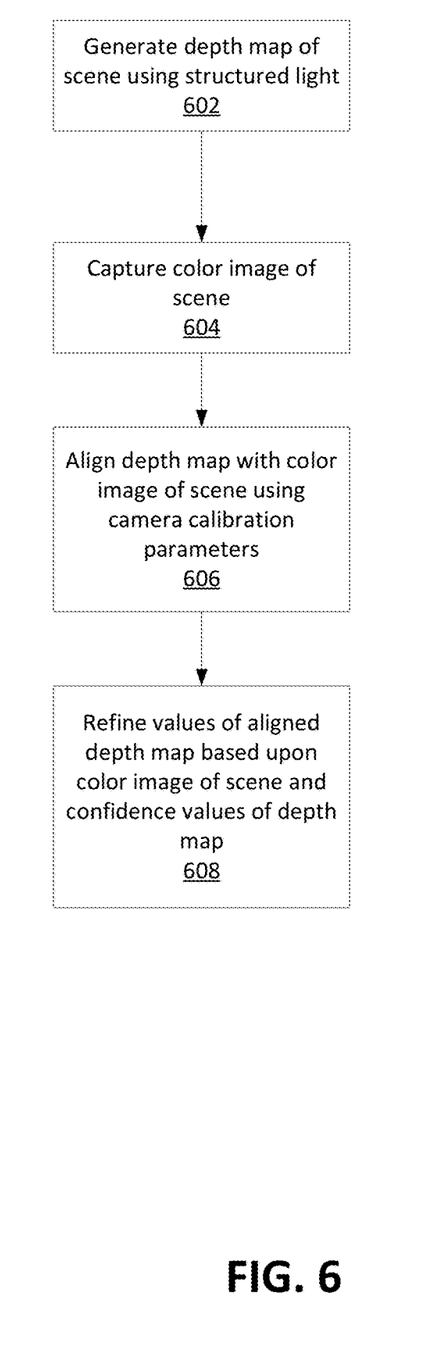
FIG. 6 is a flowchart of a process for performing depth map refinement, in accordance with some embodiments.

FIG. 6 is a flowchart of a process for performing depth map refinement, in accordance with some embodiments. At block 602, a depth map is generated. The depth map may have been generated using techniques such as structured light, where a pattern of codewords is projected onto a scene using a transmitter operating at infrared (IR) or near infrared (NIR) frequencies. The projected codewords may be identified by a receiver. By determining disparities between locations of identified codewords with their expected locations, depth information for the scene may be obtained. In some embodiments, the depth map may contain areas with no depth information (e.g., outage areas) or areas with low confidence. This may be due to tilted surfaces of objects in the scene, textured surfaces, shadows, think objects, and/or the like.

At block 604, a color image of the scene is captured. In some embodiments, the color image may comprise an RGB image. In some embodiments, the color image may be capturing using a camera. The camera may be located at a known position relative to the transmitter/receiver used to generate the depth map. For example, the camera may be located in a line with transmitter and receiver.

At block 606, the depth map is aligned with the color image using one or more camera calibration parameters. In some embodiments, the camera calibration parameters may specify a position of the camera relative to the transmitter and/or receiver. In some embodiments, aligning the depth map and color image may comprise warping the depth map based upon the one or more camera calibration parameters such that the depth map may be overlaid on the color image. In other embodiments, the color image may be warped to be aligned with the depth map.

At block 608, depth values of the aligned depth map are refined based upon the color image. For example, an amount of refinement for each depth value of the aligned depth map is based upon the confidence value of the depth value and a smoothing function based upon a corresponding location of the depth value on the color image. In some embodiments, outage areas of the depth map may be filled in with depth values, based upon the color values of the color image (e.g., using a smoothing function). In some embodiments, depth values of areas of the depth map (e.g., other areas associated with low confidence) may be adjusted based upon associated confidence values and corresponding color values of the color image (e.g., using the smoothing function). On the other hand, areas of the depth map with high confidence may experience little or no adjustment. Examples of specific implementations of depth map refinement are discussed in greater detail below.

Depth Map Refinement

As discussed above, when refining a depth map, the amount a particular depth value is adjusted should be based upon an amount of confidence that the depth value is correct. For example, referring back to FIG. 3, the depth map 302 comprises regions 304 where the depth values have a high confidence, as well as regions 306 or 308 where the depth values have low confidence or there are missing depth values. As such, when refining the depth map, depth values of regions 304 (e.g., high confidence) should experience little to no adjustment, while depth values of regions 306/308 (e.g., little to no confidence) may be adjusted by a significant amount.

In some embodiments, adjustments of depth values using a color image are based upon a smoothing function. The smoothing function may act as an interpolator to determine a depth value for a region of low confidence using the depth values of surrounding regions, based upon the color values of the corresponding regions of the color image.

Figure 7:
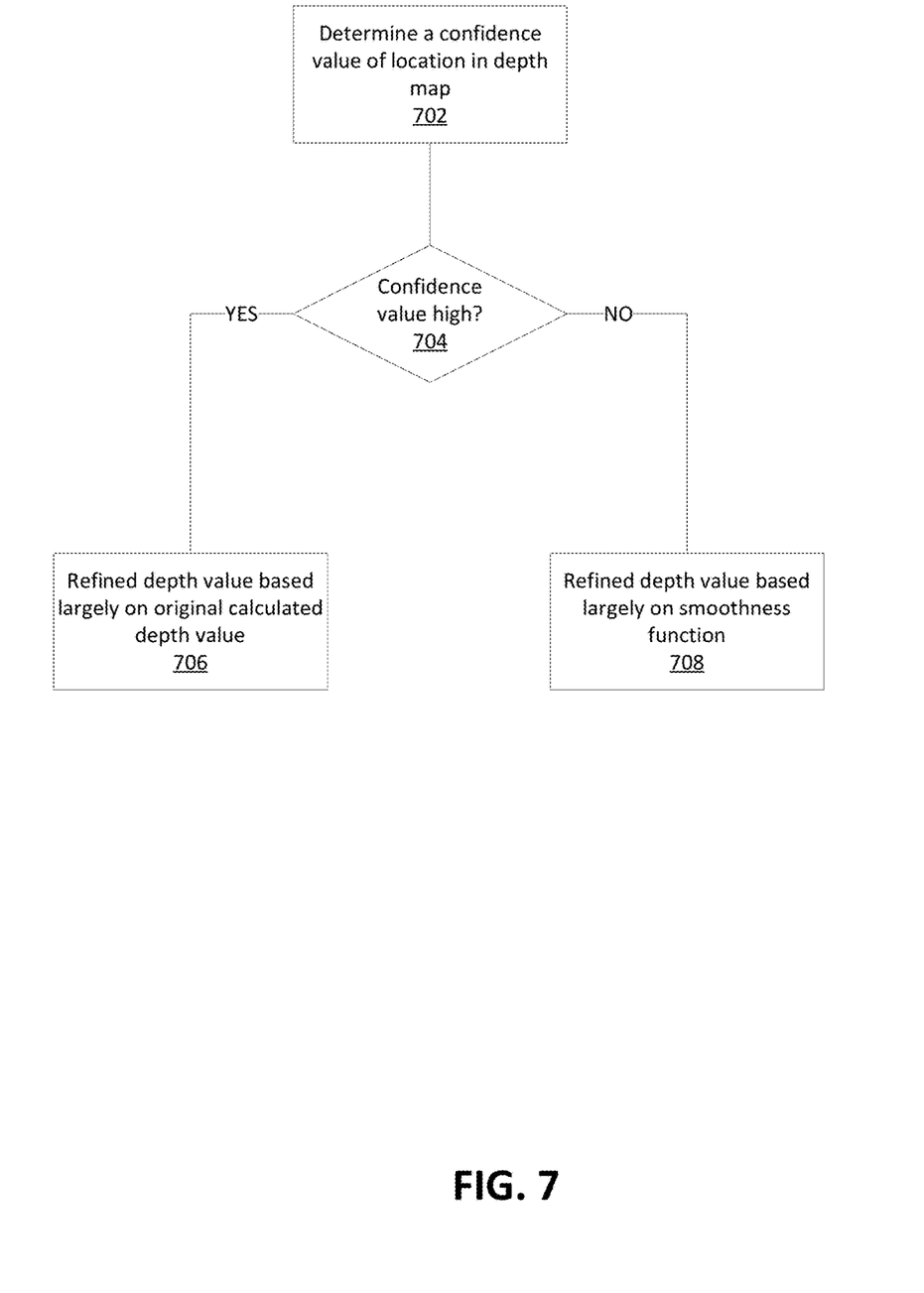
FIG. 7 illustrates a flowchart of an example process for depth map refinement, in accordance with some embodiments.

FIG. 7 illustrates a flowchart of an example process for depth map refinement, in accordance with some embodiments. At block 702, a confidence value corresponding to a location on a depth map is determined. The depth map may be an aligned depth map that has been warped such that it may be overlaid on a corresponding color image. In some embodiments, the confidence value may be a value between 0 and 1. For example, areas of the depth map having high confidence may have a confidence value of 1 or close to 1. On the other hand, areas of the depth map with missing depth information (e.g., outage areas) may have a confidence value of 0.

At block 704, a determination is made as to whether the confidence value of the location of the depth map is high. In some embodiments, the confidence value may be compared with a threshold value.

If the confidence value is high, then at block 706, the refined depth value may be based largely on the original depth value of the location on the depth map. On the other hand, if the confidence value is not high, then at block 708, the refined depth value may be calculated based largely on a smoothing function. For example, the refined depth value of the location on the depth map may be interpolated from depth values of nearby locations on the depth map, based upon the color values of the corresponding locations of the color image.

Although FIG. 7 illustrates basing depth map adjustment on either the original depth value or on a smoothness function, it is understood that in some embodiments, the amount of adjustment to depth values within the depth map may be expressed as a function of confidence level, the original depth value of the location on the depth map, and the smoothness function based upon color values at or near a corresponding location on a color image. For example, the higher the confidence, the more the original depth value will be weighted over the smoothness function value, and vice versa.

Figure 8:
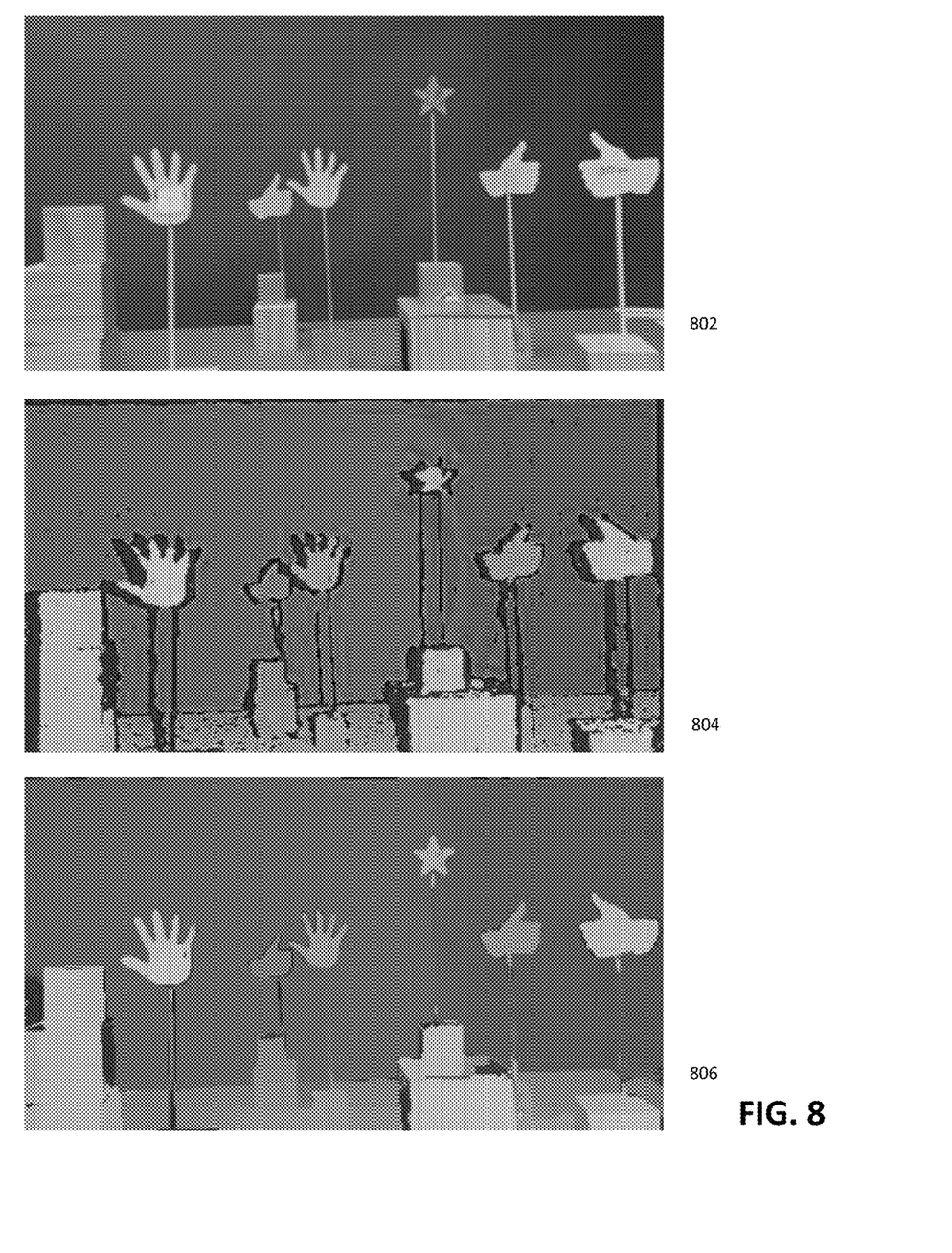
FIG. 8 illustrates another example of depth map refinement performed on a scene, in accordance with some embodiments.

FIG. 8 illustrates another example of depth map refinement performed on a scene, in accordance with some embodiments. The scene, as captured in color image 802, may contain a plurality of different objects having thin sections and narrow contours that may be difficult to obtain depth value for using a structured light system. For example, as shown in depth map 804, depth information for areas near the finger objects may be difficult to detect, causing numerous outages in the depth map. By refining depth map 804 using color image 802, a refined depth map 806 may be generated. As illustrated in refined depth map 806, areas of high confidence in depth map 804 have remained substantially unchanged, while outage areas of depth map 804 have been greatly reduced.

In some embodiments, depth map refinement may be described using one or more functions. For example, Equation 1 below describes a function that may be used to perform depth map refinement in accordance with some embodiments:

$$\hat{x} = \arg\min_{x} \| W(x-y) \|_2^2 + \beta s(x \mid r) \qquad (1)$$

wherein y corresponds to the input depths of the depth map (e.g., generated using structured light), x corresponds to the output depth of the depth map after refinement, r corresponds to the color image (e.g., from the RGB sensor or camera), and w corresponds to a degree of confidence of the pre-refinement depth map values. For example, areas of the depth map having high confidence may have a confidence value of 1, while outage areas lacking depth information may have a confidence value of 0. In some embodiments, y, x, r, and w may correspond to matrices, each matrix value corresponding to a pixel or group of pixels within an image frame. W, as shown in Equation 1 above, may correspond to a diagonal matrix of w. $\beta$ corresponds to a constant that may be used to affect the relative weights of the terms of Equation 1.

In Equation 1 above, $\hat{x}$ corresponds to a value of x that minimizes the sum of the first term $\|W(x-y)\|_2^2$ and the second term βs(x|r). The first term $\|W(x-y)\|_2^2$ functions to reduce the amount of refinement in areas of the depth map where confidence is high. As such, in areas of high confidence (e.g., w is equal or close to 1), x will be close to y, such that (x−y) will be close to zero, indicating that the value of the depth map is not substantially changed by the refinement. On the other hand, in areas of the depth map with low confidence or in outage areas (e.g., confidence is 0), the difference between x and y will become largely irrelevant.

The second term βs(x|r) comprises a constant β and a smoothing function s(x|r). In regions of the depth map with low depth confidence w, the refined depth x will be largely determined by the smoothing function. For example, the refined depth value x at an area of the depth map having low confidence may be based upon the color value r of the corresponding area of the color image relative to the color values r of surrounding areas of the color image. In some embodiments, edge detection may be used to identifying the edges of objects in the color image, and the smoothing function may be configured to smooth along the identified edges. By performing smoothing along the edges of objects in the scene and not across the edges of the objects, the adjusted depth values may be based upon depth values of the nearby regions on the same object, and not upon depth values of nearby regions of other objects.

Thus, Equation 1 may be used to determine a refined depth map having depth values $\hat{x}$, wherein the depth values do not deviate from the pre-refinement values of the depth map in areas with high confidence, and are determined largely using a smoothing function based upon a color image of the scene aligned with the depth map, for areas in the depth map with low confidence.

Examples of Iterative Depth Map Refinement

In some embodiments, it may be important to be able to perform depth map refinement very quickly (e.g., in substantially real time). For example, depth map information of a changing scene may be received and refined in substantially real-time in order to produce a three-dimensional model of the scene.

In some embodiments, depth map refinement may be performed as an iterative denoising process. For example, the refined depth value x may be initially set to the unrefined depth value y, and then denoised over one or more iterations to obtain a refined depth value.

Table 1 below illustrates pseudocode for a first example iterative method for depth map refinement, in accordance with some embodiments.

TABLE 1

$\hat{v} \leftarrow y$
for k = 1:N
$\hat{x} = \hat{v}$ $\hat{v} = \arg\min_v \beta s(v \mid r) + \lambda \|\hat{x} - v\|_2^2$ end As illustrated above in Table 1, when an initial unrefined depth map having depth values y is received, a placeholder value $\hat{v}$ may be set to the initial unrefined depth values. Over N iterations, the refined depth value x may be set to the placeholder value $\hat{v}$, which is then updated based upon a smoothing function using the color values of the color image. For example, $\hat{v}$ may be updated to minimize an aggregation of a first term based upon a smoothing function s(v|r) (modified by a constant β) and a second term $\|\hat{x}-v\|_2^2$ (modified by a constant λ) based upon a difference between v and $\hat{x}$. In other words, $\hat{v}$ is updated such that it remains close $\hat{x}$ (based upon the second term) while being smoothed by the smoothing function (based upon the first term). The number of iterations N may correspond to any integer value, such as 3.

Table 2 illustrates pseudocode of an alternate embodiment for refining a depth map. As illustrated in Table 2, a value u, which may be initially set to 0, may correspond to a Lagrangian value. During each iteration, the refined depth value $\hat{x}$ may be set to a value that minimizes a total adjustment (x−y) based on confidence W and an incremental adjustment based upon the current x value, the placeholder value $\hat{v}$, and the Lagrangian u. For example, for regions of the depth map with high confidence, (x−y) may be minimized, while for regions with low or zero confidence, (x−y) may be largely irrelevant. The placeholder value $\hat{v}$ may be adjusted based upon the smoothing function s(v|r) and an incremental adjustment based upon the current x value, the placeholder value incremental adjustments of $\hat{x}$ and $\hat{v}$.

TABLE 2

$\hat{v} \leftarrow y$
$u \leftarrow 0$
for k = 1:N $\hat{x} = \arg\min_x \|W(x-y)\|_2^2 + \lambda \|x - (\hat{v} - u)\|_2^2$ $\hat{v} = \arg\min_v \beta s(v \mid r) + \lambda \|(\hat{x} + u) - v\|_2^2$ $u = u + \hat{x} - \hat{v}$
end Each of x, y, v, and u above may correspond to a matrix having a plurality of elements, each element corresponding to a pixel or group of pixels of the image frame. An element of x, y, v, and u may be expressed as $x_i$, $y_i$, $v_i$, and $u_i$, respectively, wherein i indicates a position of an element in a corresponding matrix. In some embodiments, each the adjustment of $\hat{x}$ may be calculated on a per element level, as shown in Equation (2) below.

$$\hat{x}_i = \frac{w_i y_i + \lambda(\hat{v}_i - u_i)}{w_i + \lambda} \qquad (2)$$

As illustrated in Equation (2), $x_i$, over each iteration, may be calculated as a weighted average between the corresponding unrefined depth value and a correction amount based on the smoothing function s(v|r). For example, at locations with high confidence (e.g., $w_i$ being close to or equal to 1, $x_i$ will remain close to $y_i$. On the other hand, in outage areas (e.g., $w_i$=0), then $x_i$ will be defined by $v_i$ and Lagrangian $u_i$.

Table 3 illustrates pseudocode of another alternate embodiment for refining a depth map. The embodiment illustrated in Table 3 may considered an intermediate between those illustrated in Table 1 and Table 2. For example, $\hat{x}$ and $\hat{v}$ may be updated each iteration similar to the embodiment illustrated in Table 1, with the addition of a Lagrangian term u.

TABLE 3

$\hat{v} \leftarrow y$
$u \leftarrow 0$

TABLE 3-continued

```
    for k = 1:N
        x̂ = (v̂ - u).

v̂ = argmin β s(v | r) + λ||x̂ + u - v||₂²
             v u = u + x̂ - v̂
    end
```

In some embodiments, different types of equations may be used to determine the refined depth map values x̂. For example, Equation (3) (identical to Equation (1) above) illustrates setting x̂ to minimize a sum of first term $\|W(x-y)\|_2^2$ (confidence value term) and second term $\beta \, s(x|r)$ (smoothness term).

$$\hat{x} = \arg\min_{x} \; \|W(x-y)\|_2^2 + \beta \, s(x|r) \tag{3}$$

In some embodiments, the expression shown in Equation (3) may be difficult to minimize. For example, an equation may be minimized for x may determining a derivative of the equation with respect to x, setting the derivative to 0, and solving for x. However, in some embodiments, the derivative of $\|W(x-y)\|_2^2 + \beta \, s(x|r)$ may be complex, making x difficult to solve for.

Equation (4) illustrates an embodiment replacing x in the smoothing function with a placeholder value v. Equation (4) may be minimized by first optimizing the equation for x, and then for v. When optimizing for x, only the first term $\|W(x-y)\|_2^2$ is considered. The first term $\|W(x-y)\|_2^2$ is typically a quadratic equation with a linear derivative, making the term $\|W(x-y)\|_2^2$ relatively easy to optimize (e.g., easy to set to 0 and solver for x). When optimizing for v, only the second term $\beta \, s(v|r)$ is considered. The second term $\beta \, s(v|r)$ can be expressed as a denoising operation for which an optimization is known. For example, the smoothing function s(v|r) may be implemented by a denoiser which may be used to determine an optimal value for v. However, because a constraint of x=v is imposed, Equation (4) is functionally identical to Equation (3).

$$(\hat{x}, \hat{v}) = \underset{(x,v)|x=v}{\arg\min} \|W(x-y)\|_2^2 + \beta s(v|r) \tag{4}$$

In some embodiments, an augmented Lagrangian function such as that illustrated in Equation (5) below may be used to decouple x and v. As such, the smoothness term $\beta \, s(v|r)$ may be based upon v without being directly tied to x. Instead, the augmented Langrangian term $\lambda \|x-v+u\|_2^2$ may be used to ensure that the value of x converges towards v with each iteration.

$$(\hat{x}, \hat{v}) = \underset{(x,v)}{\arg\max} \|W(x-y)\|_2^2 + \beta s(v|r) + \lambda\|x - v + u\|_2^2 \tag{5}$$

Depth Map Refinement Using Denoising

In some embodiments, the updating of v̂ as illustrated in Tables 1, 2, or 3 may be expressed as a denoising function. For example, Table 4 below illustrates the iterative method illustrated in Table 1 using a denoising function to determine x̂.

TABLE 4

```
    x̂ ← y
    for k = 1:N
        x̂ ← v̂ v̂ = DENOISE(x̂, √(β/λ))

end
```

In some embodiments, the denoising function may include a Lagrangian u, as illustrated in Equation 6 below.

$$DENOISE\left(\hat{x} + u, \sqrt{\frac{\beta}{\lambda}}\right) \tag{6}$$

In some embodiments, an imaging signal processor (ISP) associated with a camera (e.g., camera 302 used for capturing color images) may contain a denoiser implemented in hardware. In some embodiments, the denoiser may be implemented in software. The denoiser may be used to achieve noise reduction and feature preservation in captured images.

The existing denoiser of the ISP may be used to perform depth map refinement. For example, the DENOISE function as shown in Table 4 and Equation 6 may correspond to any type of existing denoiser already implemented in a camera ISP. The use of existing denoising functions already present on an ISP in the system allows for a more simplified system that is able to take advantage of existing hardware and processing resources, potentially allowing for faster and more efficient depth map refinement. Types of denoising functions that may be used include block matching and 3D filtering (BM3D), anisotropic diffusion, SUSAN filter, Gaussian filter, weighted median filter, and/or the like. Other example types of denoising functions are described in "A Review of Image Denoising Algorithms, with a New One," by Antoni Buades, et al., submitted Jan. 21, 2010, available at hal.archives-ouvertes.fr/hal-00271141/file/061602r.pdf, which is hereby incorporated by reference in its entirety.

Other Considerations

The above detailed description is directed to certain specific embodiments of the invention. However, the invention can be embodied in a multitude of different ways. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

The systems and methods described herein may be implemented on a variety of different computing devices that hosts an active spatial sensing system. These include dedicated imaging systems, mobile phones, tablets, dedicated cameras, wearable computers, personal computers, photo booths or kiosks, personal digital assistants, ultra-mobile personal computers, and mobile Internet devices. They may use general purpose or special purpose computing system environments or configurations. Examples of computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described in the figures. The novel algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium," "computer-readable medium," and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

A person having ordinary skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A computer-implemented method comprising:
   receiving a color image of a scene;
   receiving a depth map of the scene, the depth map comprising one or more depth values, wherein each depth value of the one or more depth values of the depth map indicates a depth of an object in the scene and a location of each depth value of the one or more depth values of the depth map corresponds to a location in the color image; and iteratively adjusting the one or more depth values of the depth map based on one or more color values of the color image, wherein iteratively adjusting the one or more depth values includes:
  adjusting a first depth value of the one or more depth values to a first adjusted depth value during a first iteration of adjusting the one or more depth values, wherein the first depth value is associated with a first confidence value and adjusting the first depth value includes:
    determining whether the first confidence value is greater than a threshold;
    determining that the first adjusted depth value is based on the first depth value in response to determining that the first confidence value is greater than the threshold; and
    determining that the first adjusted depth value is based on an adjusted depth value determined by applying a smoothing filter to the depth map at the location of the first depth value in response to determining that the first confidence value is less than the threshold; and
  adjusting the first adjusted depth value to a second adjusted depth value during a second iteration of adjusting the one or more depth values, wherein the first adjusted depth value is associated with a second confidence value and adjusting the first adjusted depth value is further based on the second confidence value;
wherein the first adjusted depth value and the second adjusted depth value are based on a first color value at a first location in the color image corresponding to a location of the first depth value in the depth map.

2. The computer-implemented method of claim 1, wherein adjusting the first adjusted depth value comprises applying the smoothing filter to the depth map at the location of the first adjusted depth value.

3. The computer-implemented method of claim 1, wherein adjusting the first depth value further comprises combining the first depth value and the adjusted depth value.

4. The computer-implemented method of claim 1, wherein the depth map is unaligned with the color image, the method further comprising:
  aligning the depth map and the color image; and
  determining corresponding locations between the depth map and the color image for each depth value of the one or more depth values.

5. The computer-implemented method of claim 1, further comprising:
  projecting, by a transmitter, codewords on to the scene;
  receiving, by a receiver, an image of the scene, wherein the image comprises reflections of the projected codewords from the scene;
  identifying codewords from the reflections of the projected codewords in the received image;
  determining the one or more depth values for the depth map based on the identified codewords; and
  capturing, by an image sensor, the color image of the scene.

6. An apparatus, comprising:
  at least one processor configured to:
    receive a color image of a scene;
    receive a depth map of the scene, the depth map comprising one or more depth values, wherein each depth value of the one or more depth values of the depth map indicates a depth of an object in the scene and a location of each depth value of the one or more depth values of the depth map corresponds to a location in the color image; and
    iteratively adjust the one or more depth values of the depth map based on one or more color values of the color image, wherein iteratively adjusting the one or more depth values includes:
      adjusting a first depth value of the one or more depth values to a first adjusted depth value during a first iteration of adjusting the one or more depth values, wherein the first depth value is associated with a first confidence value and adjusting the first depth value includes:
        determining whether the first confidence value is greater than a threshold;
        determining that the first adjusted depth value is based on the first depth value in response to determining that the first confidence value is greater than the threshold; and
        determining that the first adjusted depth value is based on an adjusted depth value determined by applying a smoothing filter to the depth map at the location of the first depth value in response to determining that the first confidence value is less than the threshold; and
      adjusting the first adjusted depth value to a second adjusted depth value during a second iteration of adjusting the one or more depth values, wherein the first adjusted depth value is associated with a second confidence value and adjusting the first adjusted depth value is further based on the second confidence value;
    wherein the first adjusted depth value and the second adjusted depth value are based on a first color value at a first location in the color image corresponding to a location of the first depth value in the depth map.

7. The apparatus of claim 6, wherein the at least one processor, in adjusting the first adjusted depth value, is configured to apply the smoothing filter to the depth map at the location of the first adjusted depth value.

8. The apparatus of claim 6, wherein the at least one processor, in adjusting the first depth value, is further configured to combine the first depth value and the adjusted depth value.

9. The apparatus of claim 6, wherein:
  the depth map is unaligned with the color image; and
  the at least one processor is further configured to:
    align the depth map and the color image; and
    determine corresponding locations between the depth map and the color image for each depth value of the one or more depth values.

10. The apparatus of claim 6, further comprising:
  a transmitter configured to project codewords on to the scene;
  a receiver configured to receive an image of the scene, wherein the image comprises reflections of the projected codewords from the scene; and
  an image sensor configured to capture the color image of the scene;
  wherein the at least one processor is further configured to:
    identify codewords from the reflections of the projected codewords in the received image; and
    determine the one or more depth values for the depth map based on the identified codewords.

11. A non-transitory computer readable medium comprising instructions that when executed cause at least one processor to perform a method, the method comprising:
  receiving a color image of a scene;

receiving a depth map of the scene, the depth map comprising one or more depth values, wherein each depth value of the one or more depth values of the depth map indicates a depth of an object in the scene and a location of each depth value of the one or more depth values of the depth map corresponds to a location in the color image; and iteratively adjusting the one or more depth values of the depth map based on one or more color values of the color image, wherein iteratively adjusting the one or more depth values includes:

adjusting a first depth value of the one or more depth values to a first adjusted depth value during a first iteration of adjusting the one or more depth values, wherein the first depth value is associated with a first confidence value and adjusting the first depth value includes:

determining whether the first confidence value is greater than a threshold;

determining that the first adjusted depth value is based on the first depth value in response to determining that the first confidence value is greater than the threshold; and determining that the first adjusted depth value is based on an adjusted depth value determined by applying a smoothing filter to the depth map at the location of the first depth value in response to determining that the first confidence value is less than the threshold; and adjusting the first adjusted depth value to a second adjusted depth value during a second iteration of adjusting the one or more depth values, wherein the first adjusted depth value is associated with a second confidence value and adjusting the first adjusted depth value is further based on the second confidence value;

wherein the first adjusted depth value and the second adjusted depth value are based on a first color value at a first location in the color image corresponding to a location of the first depth value in the depth map.

12. The non-transitory computer readable medium of claim 11, wherein adjusting the first adjusted depth value comprises applying the smoothing filter to the depth map at the location of the first adjusted depth value.

13. The non-transitory computer readable medium of claim 11, wherein adjusting the first depth value further comprises combining the first depth value and the adjusted depth value.

14. The non-transitory computer readable medium of claim 11, wherein:
the depth map is unaligned with the color image; and
execution of the instructions further cause the at least one processor to:
align the depth map and the color image; and
determine corresponding locations between the depth map and the color image for each depth value of the one or more depth values.

15. The non-transitory computer readable medium of claim 11, wherein execution of the instructions causes the apparatus to:
project, by a transmitter, codewords on to the scene;
receive, by a receiver, an image of the scene, wherein the image reflections of the projected codewords from the scene;
identify, by the at least one processor, codewords from the reflections of the projected codewords in the received image;

determine, by the at least one processor, the one or more depth values for the depth map based on the identified codewords; and
capture, by an image sensor, the color image of the scene.

16. The computer-implemented method of claim 3, wherein combining the first depth value and the adjusted depth value comprises a weighted average of the first depth value and the adjusted depth value, wherein weights of the weighted average are based on the first confidence value.

17. The computer-implemented method of claim 2, wherein adjusting the first depth value further comprises:
determining if the first location in the color image includes an edge; and
preventing the smoothing filter from being applied across the edge.

18. The apparatus of claim 8, wherein the at least one processor, in combining the first depth value and the adjusted depth value, is further configured to perform a weighted average of the first depth value and the adjusted depth value, wherein weights of the weighted average are based on the first confidence value.

19. The apparatus of claim 7, wherein the at least one processor, in adjusting the first depth value, is further configured to:
determine if the first location in the color image includes an edge; and
prevent the smoothing filter from being applied across the edge.

20. The non-transitory computer readable medium of claim 13, wherein combining the first depth value and the adjusted depth value comprises a weighted average of the first depth value and the adjusted depth value, wherein weights of the weighted average are based on the first confidence value.

21. The non-transitory computer readable medium of claim 12, wherein adjusting the first depth value further comprises:
determining if the first location in the color image includes an edge; and
preventing the smoothing filter from being applied across the edge.

22. The computer-implemented method of claim 4, wherein aligning the depth map and the color image includes warping the depth map to align with the color image.

23. The computer-implemented method of claim 22, wherein the first confidence value is associated with the warping of the depth map.

24. The computer-implemented method of claim 1, wherein the first confidence value is associated with a tilted surface of the object.

25. The computer-implemented method of claim 1, wherein the first confidence value is associated with a textured surface of the object.

26. The computer-implemented method of claim 1, wherein the first confidence value is associated with one or more shadows cast on the object.

27. The apparatus of claim 9, wherein the at least one processor, in aligning the depth map and the color image, is configured to warp the depth map to align with the color image.

28. The apparatus of claim 27, wherein the first confidence value is associated with the warping of the depth map.

29. The apparatus of claim 6, wherein the first confidence value is associated with a tilted surface of the object.

30. The apparatus of claim 6, wherein the first confidence value is associated with a textured surface of the object.

31. The apparatus of claim 6, wherein the first confidence value is associated with one or more shadows cast on the object.

* * * * *